United States Patent [19]
Burgess et al.

[11] Patent Number: 5,141,194
[45] Date of Patent: Aug. 25, 1992

[54] RETRACTABLE CONTAINER HOLDER

[75] Inventors: Martin Burgess, Bromley; John A. G. Percy, Upminster, both of Great Britain

[73] Assignee: Ford Motor Company, Dearborn, Mich.

[21] Appl. No.: 666,975

[22] Filed: Mar. 11, 1991

[30] Foreign Application Priority Data

Mar. 15, 1990 [GB] United Kingdom ............... 9005790

[51] Int. Cl.⁵ ............................................. A47K 1/08
[52] U.S. Cl. .................................. 248/311.2; 248/150; 297/145; 297/194
[58] Field of Search ............... 248/311.2, 150, 155.4, 248/293, 240.1; 224/273, 274; 297/145, 194

[56] References Cited

U.S. PATENT DOCUMENTS

| | | |
|---|---|---|
| 3,306,566 | 2/1967 | Paulson et al. ............... 248/311.2 X |
| 3,606,112 | 9/1971 | Cheshier . |
| 4,530,480 | 7/1985 | Pratt . |
| 4,728,018 | 3/1988 | Parker . |
| 4,733,908 | 3/1988 | Dykstra et al. ..................... 297/194 |
| 4,756,572 | 7/1988 | Dykstra et al. ..................... 297/194 |
| 4,892,281 | 1/1990 | DiFilippo et al. ................ 248/311.2 |
| 4,907,775 | 3/1990 | Lorence et al. ................. 248/311.2 |
| 4,953,771 | 9/1990 | Fischer et al. ............... 248/311.2 X |
| 4,955,571 | 9/1990 | Lorence et al. ................. 248/311.2 |
| 5,007,610 | 4/1991 | Christiansen et al. ........... 248/313 X |

*Primary Examiner*—Ramon O. Ramirez
*Attorney, Agent, or Firm*—Daniel M. Stock; Roger L. May

[57] ABSTRACT

A retractable container holder is stowed in a generally upright flat pocket 12 and has four hinged plates which open into an inverted triangle shape, the top of which has apertures for receiving containers and the side plates of which are also apertured to allow the containers to stand on a flat base. The holder includes appropriate springs so that when a storage latch 58 is released, the holder is raised into its operative position by spring action.

9 Claims, 3 Drawing Sheets

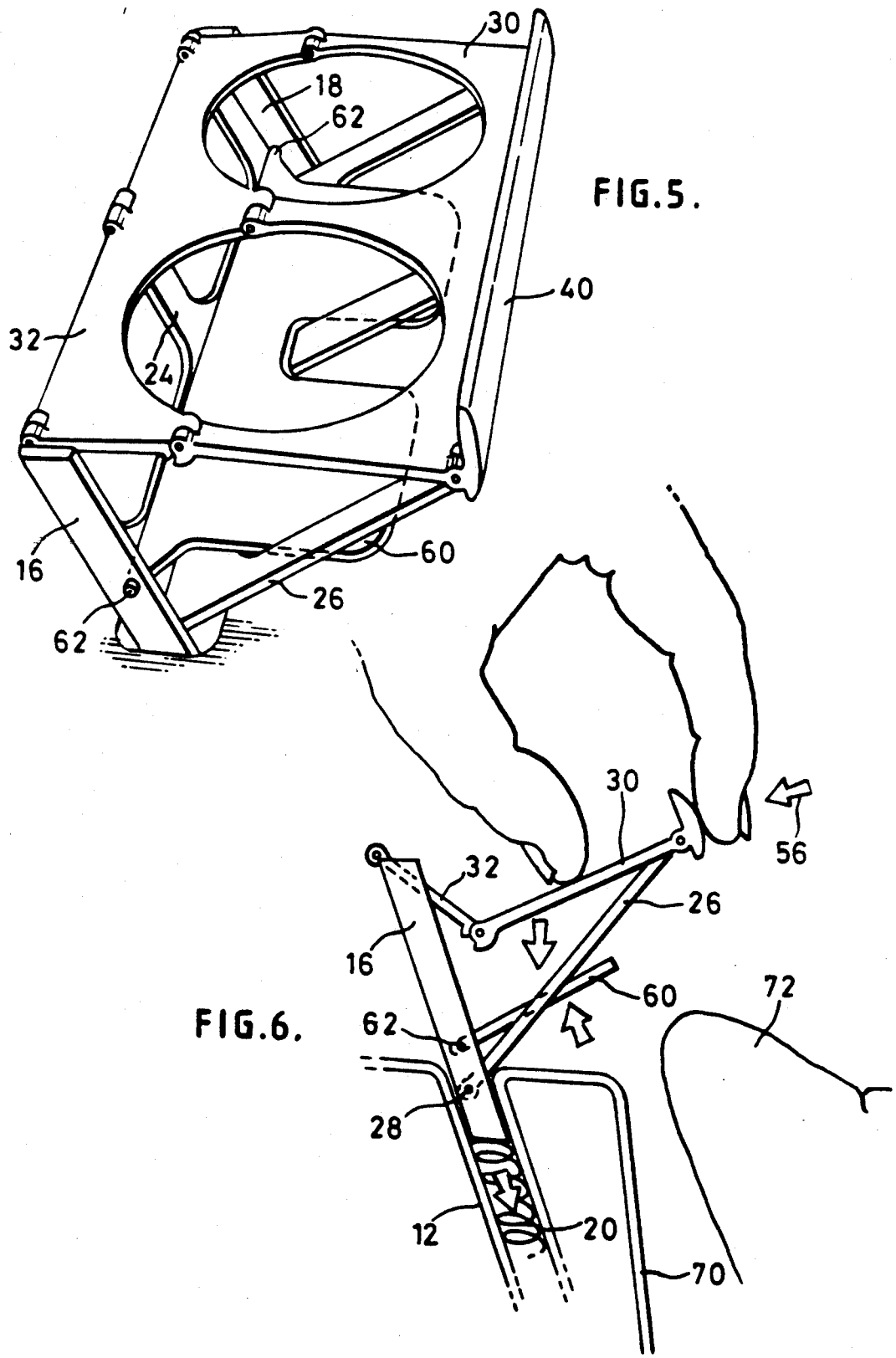

RETRACTABLE CONTAINER HOLDER

BACKGROUND OF THE INVENTION

1. Field of the Invention

This invention relates to a retractable container holder which may be used in a vehicle to hold and support a container, such as a drinking cup or a beverage can, without the container spilling. The holder should be capable, however, of being stowed away when not in use.

2. Description of the Related Art

A retractable container holder is known from WO 84/04072 wherein a system of pivoted and sprung links are retracted into a box-like container. In this construction, the links are cantilevered from the container when they are in use. Because the links are connected to one another by a total of eleven different hinge axes, the rigidity of the support will be less than could be desired. This holder will support just one container.

SUMMARY OF THE INVENTION

According to the present invention, there is provided a retractable holder for a container, the holder comprising a flat pocket-like housing and a collapsible structure formed of hinged plates and springs which can fold to fit inside the housing and which can be erected above the housing to form a support for a container mounted on a pair of rigid legs which are slidable into and out of the housing. With this construction, because the housing is flat and thin, being like a pocket, a small number of hinge axes are required.

The rigid legs are preferably biased in a direction upwardly of the housing, and the collapsible structure is normally held within the housing by means of a releasable latch. The latch acts to keep the biasing means compressed while the holder is retracted.

The holder preferably comprises four hinged plates, all with parallel hinge axes. Two of the plates preferably form an upper surface of the holder, the upper surface having at least one aperture therein to support a container. The other two plates are then connected to the rigid leg to support respective opposite edges of the upper surface.

The two other plates may also have apertures in them so that they allow the bottom edges of a container to pass through them. In one embodiment, the housing may be mounted below a flat, horizontal surface and a container in the holder may sit on the surface with its bottom edges passing through the apertures in the two plates. Alternatively, the holder may include a fifth plate which folds down to a horizontal position to provide a lower surface on which the base of a container can rest.

The holder may be adapted to hold any number of containers, but two containers is a suitable number.

DESCRIPTION OF THE DRAWINGS

The invention will now be further described, by way of example, with reference to the accompanying drawings, in which:

FIG. 4 illustrates a second stage in retraction;

FIG. 5 is a perspective view of a second embodiment of the holder in accordance with the invention; and FIG. 6 shows the holder of FIG. 5 installed in a motor vehicle during the course of retraction.

DESCRIPTION OF THE PREFERRED EMBODIMENT

Figure 1:
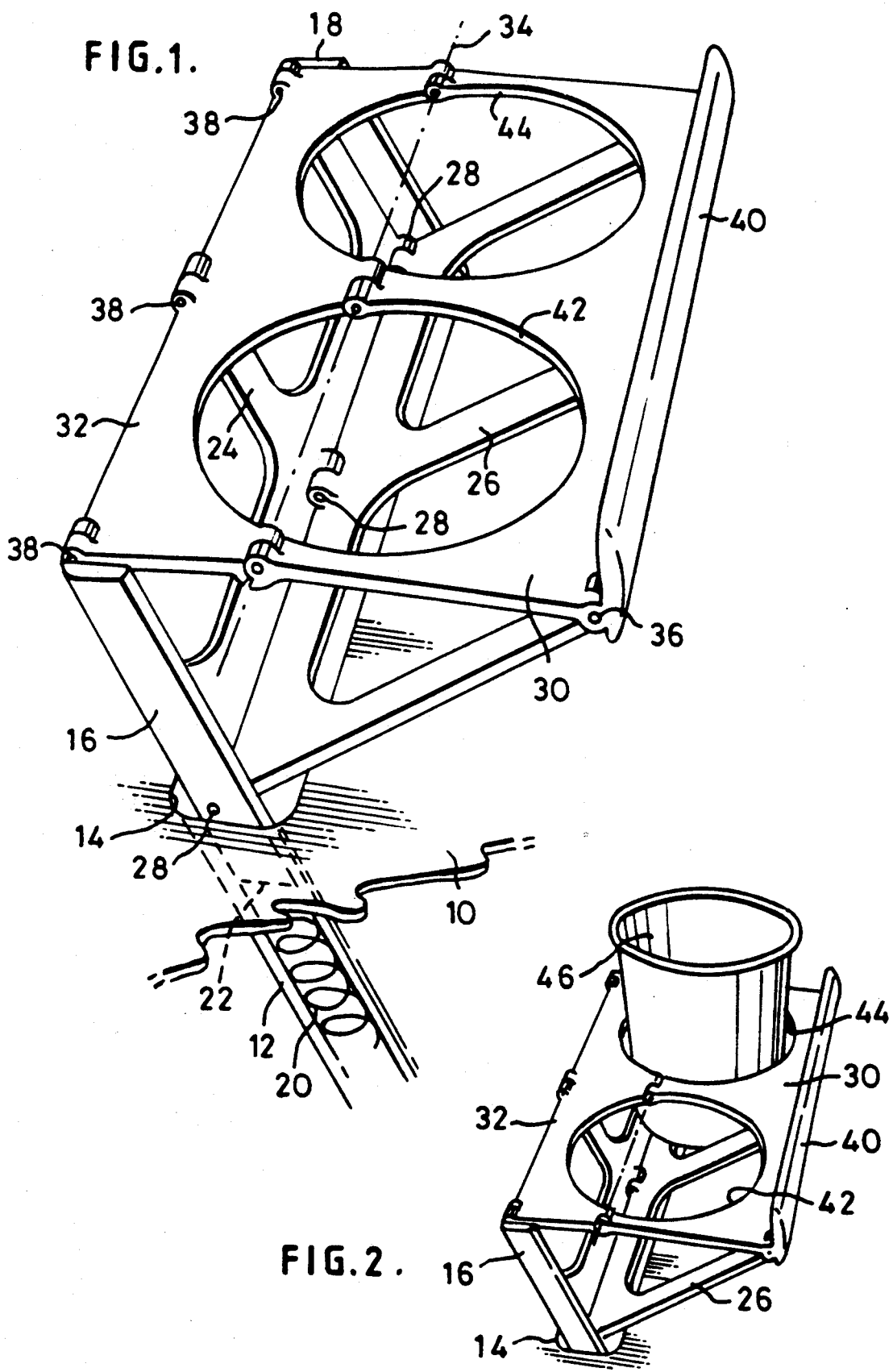
FIG. 1 is a perspective view of a container holder in accordance with the invention in the erected condition.

FIG. 1 shows a surface 10 such as a horizontal surface of a council or armrest in a vehicle in which a flat, pocket-like housing 12 is mounted in a generally upright position. The housing is not truly vertical, and the angle to the vertical which it makes will be discussed later on in this description. The housing 12 has a hollow interior 14, and two rigid legs 16 and 18 are mounted in slide guides at each end of the housing 12. A spring 20 (only one is shown) acts on the bottom end 22 of each leg to urge the legs upwards to the erected position shown in FIG. 1.

Mounted on the legs 16, 18 is a first plate 24 and a second plate 26. The first plate 24 is in fact non-movable relative to the legs 16, 18, and may be made integrally with these legs. The second plate 26 is hinged to the legs and to the bottom edge of the first plate 24 about pivot axes at 28.

At its top edge, the plate 26 is pivoted to a third plate 30 and a fourth plate 32 is pivoted to the top of the legs 16, 18, and the top of the plate 24. Furthermore, the third and fourth plates 30, 32 are pivoted to one another along an axis 34. The second plate 26 is pivoted to the third plate 30 on an axis 36, and the fourth plate 32 to the first plate 24 on an axis 38. A torsion spring (not shown) may be included acting about the axis 36 to cause the holder to open automatically. A cover panel 40 which provides a cover for the pocket 14 when the holder is retracted is formed integrally with the third plate 30.

Figures 2, 3:
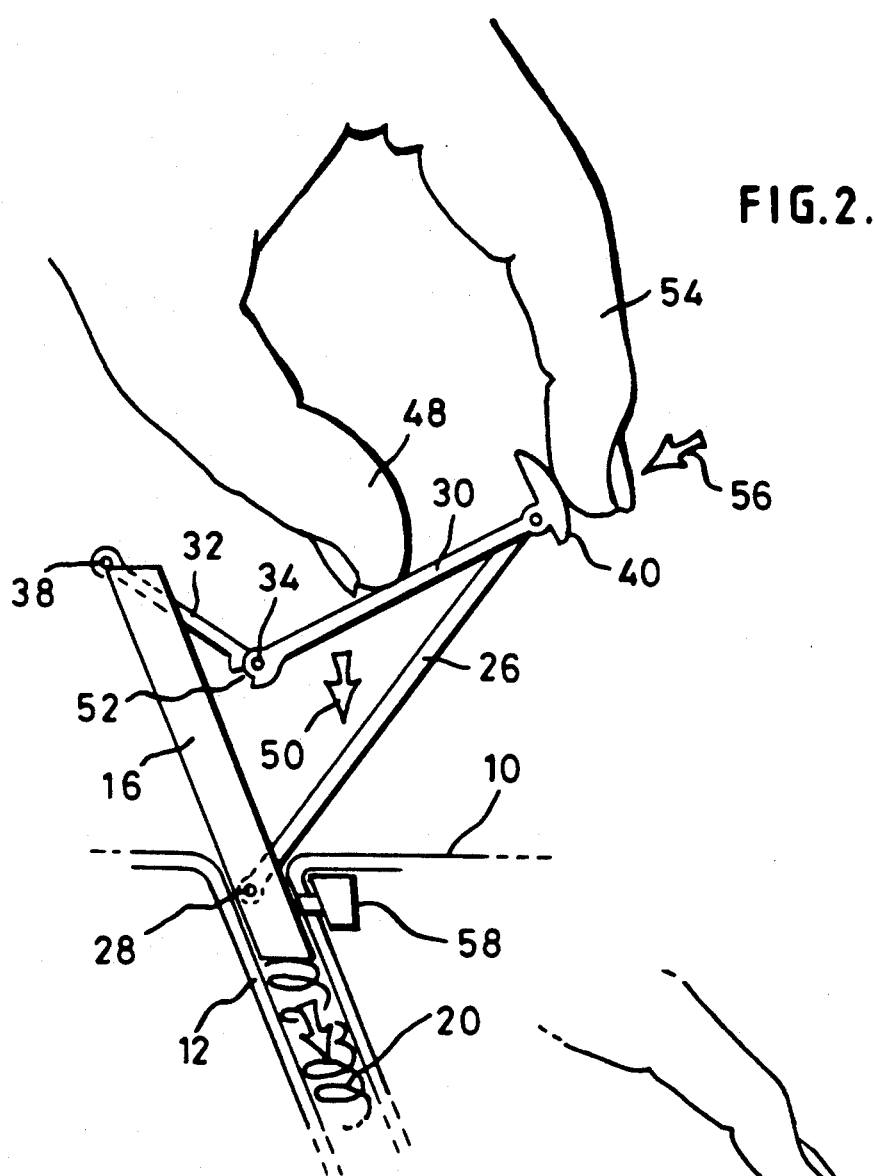
FIG. 2 illustrates the holder of FIG. 1 with one container in place.
FIG. 3 illustrates a first stage in retracting the holder of FIG. 1.

The third and fourth plate 30, 32 form between them two circular apertures 42, 44, as shown. The first and second plates 24, 26 also have apertures in them so that the bottom edges of a container inserted in the apertures 42, 44 are not obstructed by these plates. As can be seen in FIG. 2, the bottom edges of the container 46 pass through the apertures and may rest on the surface 10. Although the holder shown in FIGS. 1 and 2 has two apertures 42, 44 and can therefore support two containers, the inventions extends to a holder for a single container and to a holder for more than two containers.

FIG. 3 shows how the holder is moved from its erected position to its retracted position. First, pressing lightly with the thumb 48, pressure is applied to the top of the plate 30 to fold the two plates 30, 32 inwardly as shown by the arrow 40 against the force of the torsion spring on the axis 36. It will be noted from this figure that the two plates 30, 32 have cooperating formations at 52 to stop relative movement at a slightly over-center position of the arrow 50. The holder is not folded up.

Once the plates have started to move about their axis 34, a force is also applied by the finger 54 in the direction of an arrow 56 on the cover 40. This folds the wall 26 up and into line with the leg 16 so that the retracted holder can be pushed down against the force of the springs 20 into the housing 12. A latch button 58 engages with the fully retracted holder to hold it in the retracted position against the force of the spring 20. In this condition, just the cover 40 is visible above the surface 10.

To re-erect the holder, the latch button 58 is released and the holder will be pushed upwardly by the spring 20 and then the plates 26, 30, 32 can be folded out.

FIGS. 5 and 6 show an alternative embodiment with an additional component. Most of the parts in this figure carry the same reference numerals as in FIG. 1 to 4. The additional component is a bottom plate 60 which is hinged to the legs 16, 18 by hinge pins 62 at its ends. When the holder is erected, the bottom plate 60 falls to the position shown in FIG. 5 where it is held in a horizontal position parallel to the plates 30, 32 and supported by the edges of the recesses in the plate 26. The base plate 60 then provides a floor on which the containers in the holder can stand.

FIG. 6 illustrates in a similar way to FIG. 3 the manner in which this alternative embodiment can be folded up and retracted. The legs 16, 18 may be vertical or at a slight angle when erected (as shown). The angle shown in FIG. 6 is chosen so that a cup placed in the holder will be supported on the top surface of a console 70 and away from the edge of a seat 72.

The vertical stowage of the holder allows the holder to be located in a very small space. The holder can be folded away so that it is quite unobtrusive and yet when erected will provide steady and stable support for a beverage container. The generally upright stowage means that the holder can be conveniently located in a center console between the front seats of a motor vehicle.

The latch 58 which retains the holder in its retracted position may be a "push-push" type catch so that the holder can be erected merely by downward pressure on the cover 40.

We claim:

1. A retractable holder for a container, the holder comprising a flat pocket-like housing and a collapsible structure formed of hinged plates and springs which can fold to fit inside the housing held therein by a releasable latch and which can be erected above the housing to form a support for a container mounted on a pair of rigid legs which are slidable into and out of the housing, and are biased in a direction upwardly of the housing, and the collapsible structure is normally held with the housing by means of a releasable latch.

2. A retractable holder as claimed in claim 1 comprising four hinged plates, all with parallel hinge axes.

3. A retractable holder as claimed in claim 2, wherein two of the plates form an upper surface of the holder, the upper surface having at least one aperture therein to support a container.

4. A retractable holder for a container, the holder comprising a flat pocket-like housing and a collapsible structure formed of four hinged plates having parallel spring axes and springs which can fold to fit inside the housing and which can be erected above the housing to form a support for a container mounted on a pair of rigid legs which are slidable into and out of the housing.

5. A retractable holder as claimed in claim 4, wherein two of the plates form an upper surface of the holder, the upper surface having at least one aperture therein to support a container.

6. A retractable holder as claimed in claim 5, wherein the other two plates are connected to the rigid legs to support respective opposite edges of the upper surface.

7. A retractable holder as claimed in claim 6, wherein the two other plates also have apertures in them so that they allow the bottom edges of a container to pass through them.

8. A retractable holder as claimed in claim 7, wherein the housing is mounted below a flat, horizontal surface and a container in the holder can sit on the surface with its bottom edges passing through the apertures in the two plates.

9. A retractable holder as claimed in claim 8, including a fifth plate which folds down to a horizontal position to provide a lower surface on which the base of a container can rest.

* * * * *